(12) United States Patent
Lin et al.

(10) Patent No.: US 11,037,272 B2
(45) Date of Patent: Jun. 15, 2021

(54) REDUCTION OF LINE BANDING IMAGE ARTIFACTS

(71) Applicant: Apple Inc., Cupertino, CA (US)

(72) Inventors: Sheng Lin, San Jose, CA (US); David R. Pope, Fremont, CA (US)

(73) Assignee: Apple Inc., Cupertino, CA (US)

( * ) Notice: Subject to any disclaimer, the term of this patent is extended or adjusted under 35 U.S.C. 154(b) by 187 days.

(21) Appl. No.: 16/381,312

(22) Filed: Apr. 11, 2019

(65) Prior Publication Data

US 2020/0327644 A1 Oct. 15, 2020

(51) Int. Cl.
*G06T 5/00* (2006.01)

(52) U.S. Cl.
CPC .................... *G06T 5/002* (2013.01)

(58) Field of Classification Search
CPC ...................................................... G06T 5/002
See application file for complete search history.

(56) References Cited

U.S. PATENT DOCUMENTS

| 6,934,050 | B2 * | 8/2005 | Merrill | H01L 27/14647 358/1.16 |
| 7,098,950 | B2 | 8/2006 | Yamamoto et al. | |
| 7,924,330 | B2 | 4/2011 | Xu et al. | |
| 9,332,239 | B2 * | 5/2016 | Cote | H04N 9/646 |
| 9,466,113 | B2 * | 10/2016 | Pham | G06T 5/002 |
| 2005/0243193 | A1 | 11/2005 | Gove et al. | |
| 2008/0054320 | A1 | 3/2008 | Solhusvik et al. | |
| 2015/0348246 | A1 * | 12/2015 | Lim | G06T 5/003 382/167 |

OTHER PUBLICATIONS

Oakley, John P., and Hong Bu. "Correction of simple contrast loss in color images." IEEE Transactions on Image Processing 16.2 (2007): 511-522. (Year: 2007).*

* cited by examiner

*Primary Examiner* — Pinalben Patel
(74) *Attorney, Agent, or Firm* — Fenwick & West LLP

(57) ABSTRACT

Embodiments of the present disclosure relate to reducing line banding artifacts in raw image data. If the same line of pixel sensors (e.g., in a row) in an image sensor includes a subset of pixel sensors that receive bright light and another subset of pixel sensors that receive low light, line banding artifacts may appear in the capture raw image data. To reduce or eliminate the line banding artifacts, the raw image data is normalized by adding offset values to its pixel values. The offset values are determined from the pixel values obtained from masked pixel sensors on one or both sides of the image sensor.

18 Claims, 7 Drawing Sheets

REDUCTION OF LINE BANDING IMAGE ARTIFACTS

BACKGROUND

1. Field of the Disclosure

The present disclosure relates a circuit for processing images and more specifically to reducing line banding artifacts in the processed images.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

Raw image data captured by an image sensor may include line banding artifacts, among other artifacts, caused by bias variations between lines of sensors in the image sensor. These line banding artifacts may become noticeable and degrade the overall quality of the image data.

SUMMARY

Embodiments relate to an image processor. The image processor includes an offset circuit and a calculator circuit coupled to the offset circuit. The offset circuit is configured to receive bias information generated by an image sensor. The image sensor includes a set of pixel sensors. The bias information is derived from pixel values of a line of masked pixel sensors of a same color in the image sensor. The bias information is indicative of noise in the line of masked pixel sensors. The offset circuit is also configured to determine the bias information or a processed version of the bias information as an offset value for a pixel value of a pixel in raw image data. The pixel value is captured by an unmasked pixel sensor in the same line as the line of masked pixel sensors. The calculator circuit is configured to receive the pixel value of the pixel in the raw image data, receive the offset value for the pixel value from the offset circuit, and adjust the received pixel value by the offset value for the pixel value to generate a modified pixel value for the pixel.

In some embodiments, the offset circuit is further configured to generate for distinct sets of offset values for four different color pixels from the masked pixel sensors of four different colors (e.g., R, Gb, Gr, B).

In some embodiments, the line is a row and the offset value is determined from pixel values corresponding to pixels in at least one row of the pixel array.

In some embodiments, the bias information comprises first bias information representing processed versions of pixel values of first masked pixel sensors of the same color at one side of the image sensor. In some embodiments, the bias information further comprises second bias information representing processed versions of pixel values of second masked pixel sensors of the same color at an opposite side of the image sensor. In some embodiments, the offset circuit is configured to operate in a mode. In a first mode, the offset value is set as a first value indicated in the first bias information. In a second mode, the offset value is set as a second value indicated in the second bias information. In a third mode, the offset value is set as an interpolated value derived from the first value and the second value.

In some embodiments, the interpolated value is determined from a first distance of the pixel sensor from the one side of the raw image data and a second distance of the pixel sensor from the opposite side of the raw image data.

In some embodiments, the offset circuit is configured to receive a mode command responsive to a central processing unit performing an analysis of the raw image data.

BRIEF DESCRIPTION OF THE DRAWINGS

Figure (FIG. 1 is a high-level diagram of an electronic device, according to one embodiment.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to reducing line banding artifacts in raw image data. If the same line of pixel sensors (e.g., in a row) in an image sensor includes a subset of pixel sensors that receive bright light and another subset of pixel sensors that receive low light, line banding artifacts may appear in the capture raw image data. To reduce or eliminate the line banding artifacts, the raw image data is normalized by adding offset values to its pixel values. The offset values are determined from the pixel values obtained from the masked pixel sensors on one or both sides the image sensor.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
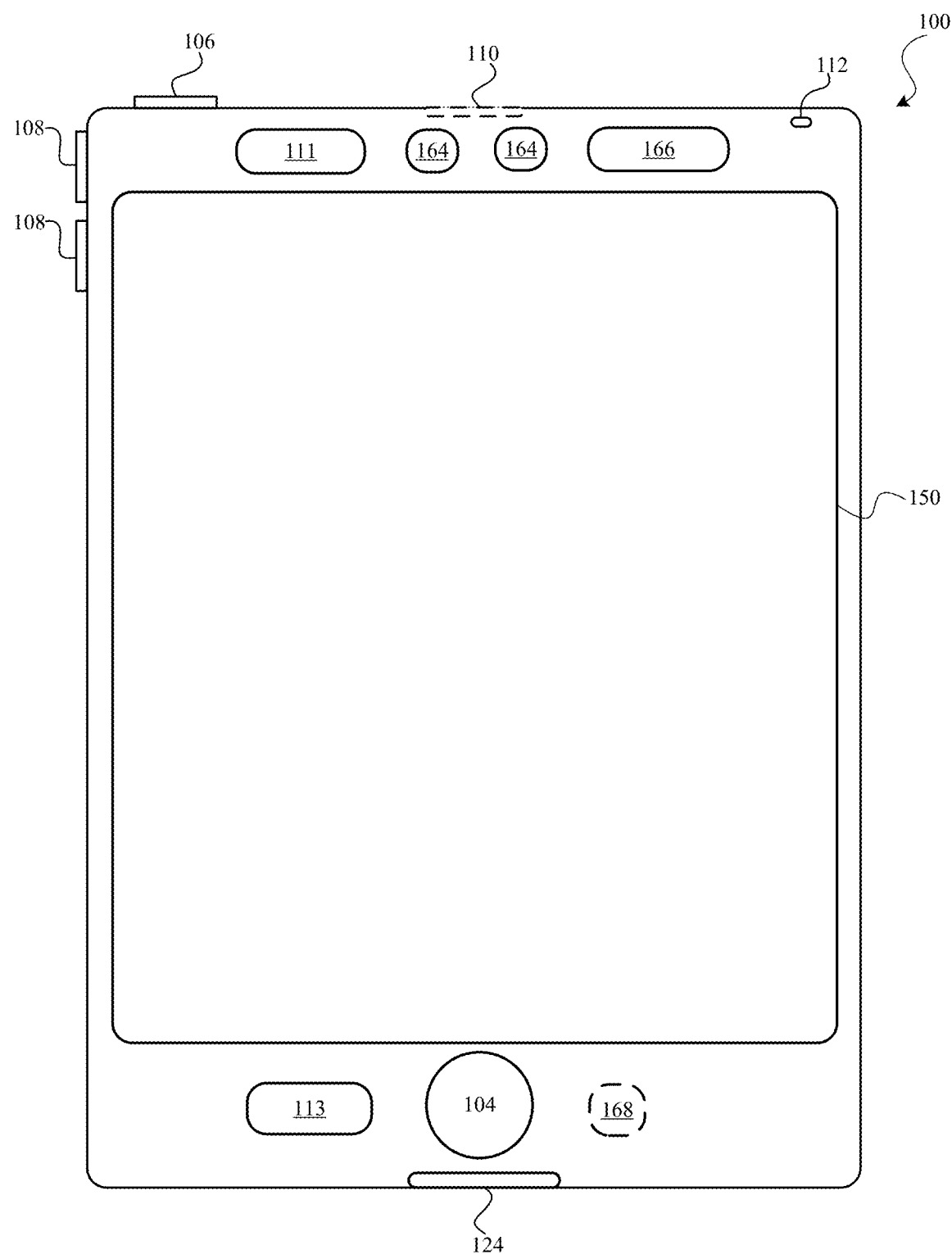

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. Device 100 may include more than one type of image sensors 164. Each type may include more than one image sensor 164. For example, one type of image sensors 164 may be cameras and another type of image sensors 164 may be infrared sensors that may be used for face recognition. Additionally, or alternatively, the image sensors 164 may be associated with different lens configuration. For example, device 100 may include rear image sensors, one with a wide-angle lens and another with as a telephoto lens. The device 100 may include components not shown in FIG. 1 such as an ambient light sensor, a dot projector and a flood illuminator.

Device 100 is only one example of an electronic device, and device 100 may have more or fewer components than listed above, some of which may be combined into a component or have a different configuration or arrangement. The various components of device 100 listed above are embodied in hardware, software, firmware or a combination thereof, including one or more signal processing and/or application specific integrated circuits (ASICs). While the components in FIG. 1 are shown as generally located on the same side as the touch screen 150, one or more components may also be located on an opposite side of device 100. For example, the front side of device 100 may include an infrared image sensor 164 for face recognition and another image sensor 164 as the front camera of device 100. The back side of device 100 may also include additional two image sensors 164 as the rear cameras of device 100.

Figure 2:
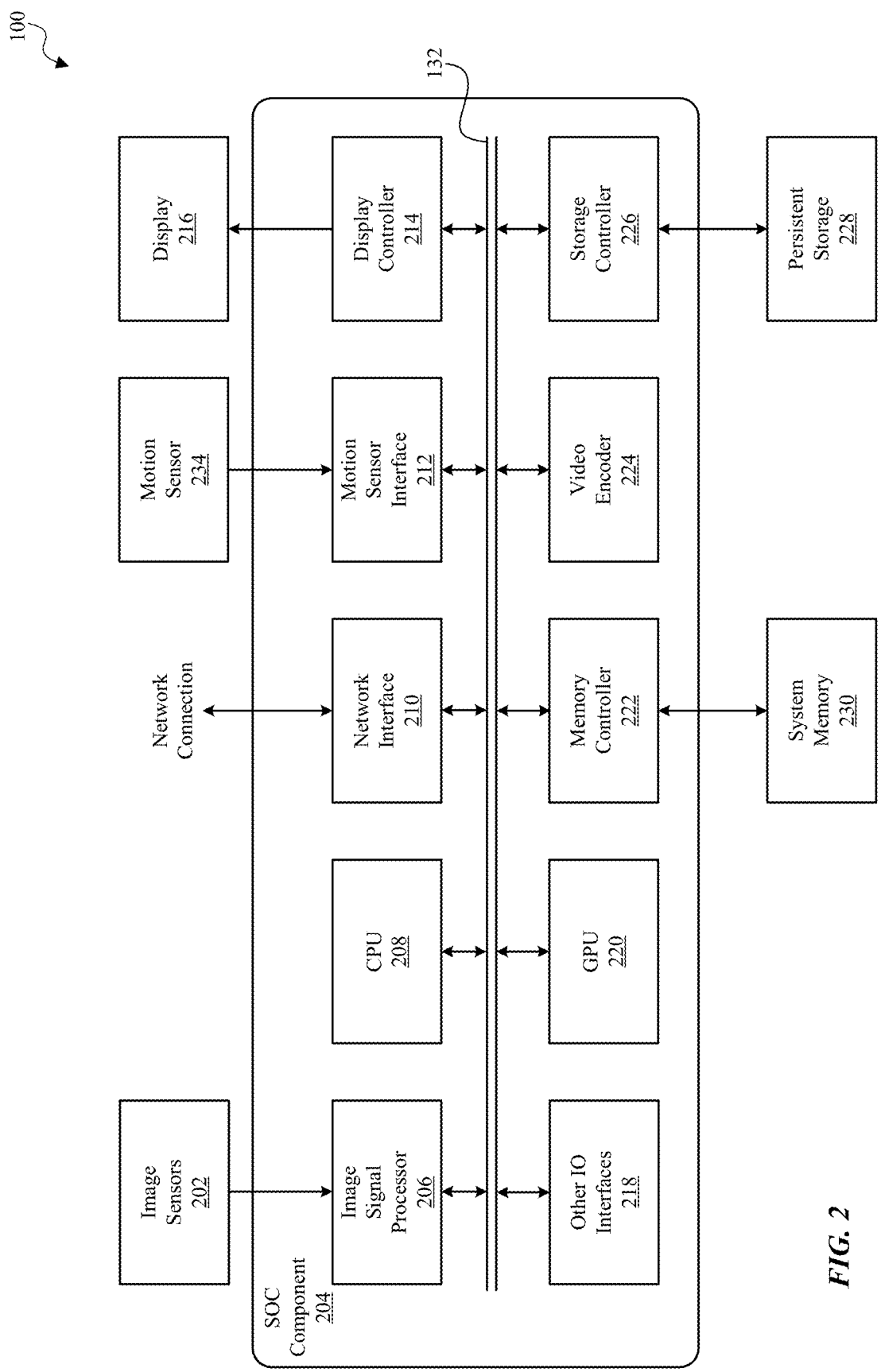
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensors 202 are components for capturing image data. Each of the image sensors 202 may be embodied, for example, as a complementary metal-oxide-semiconductor (CMOS) active-pixel sensor, a camera, video camera, or other devices. Image sensors 202 generate raw image data that is sent to SOC component 204 for further processing. In some embodiments, the image data processed by SOC component 204 is displayed on display 216, stored in system memory 230, persistent storage 228 or sent to a remote computing device via network connection. The raw image data described herein refers to a format of image in a raw format (e.g., Bayer pattern), and does not imply that no further processing was previously performed in the image. An image sensor 202 may also include optical and mechanical components that assist image sensing components (e.g., pixels) to capture images. The optical and mechanical components may include an aperture, a lens system, and an actuator that controls the focal length of the image sensor 202.

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, motion sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing operations on graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Motion sensor interface 212 is circuitry for interfacing with motion sensor 234. Motion sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensors 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensors 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
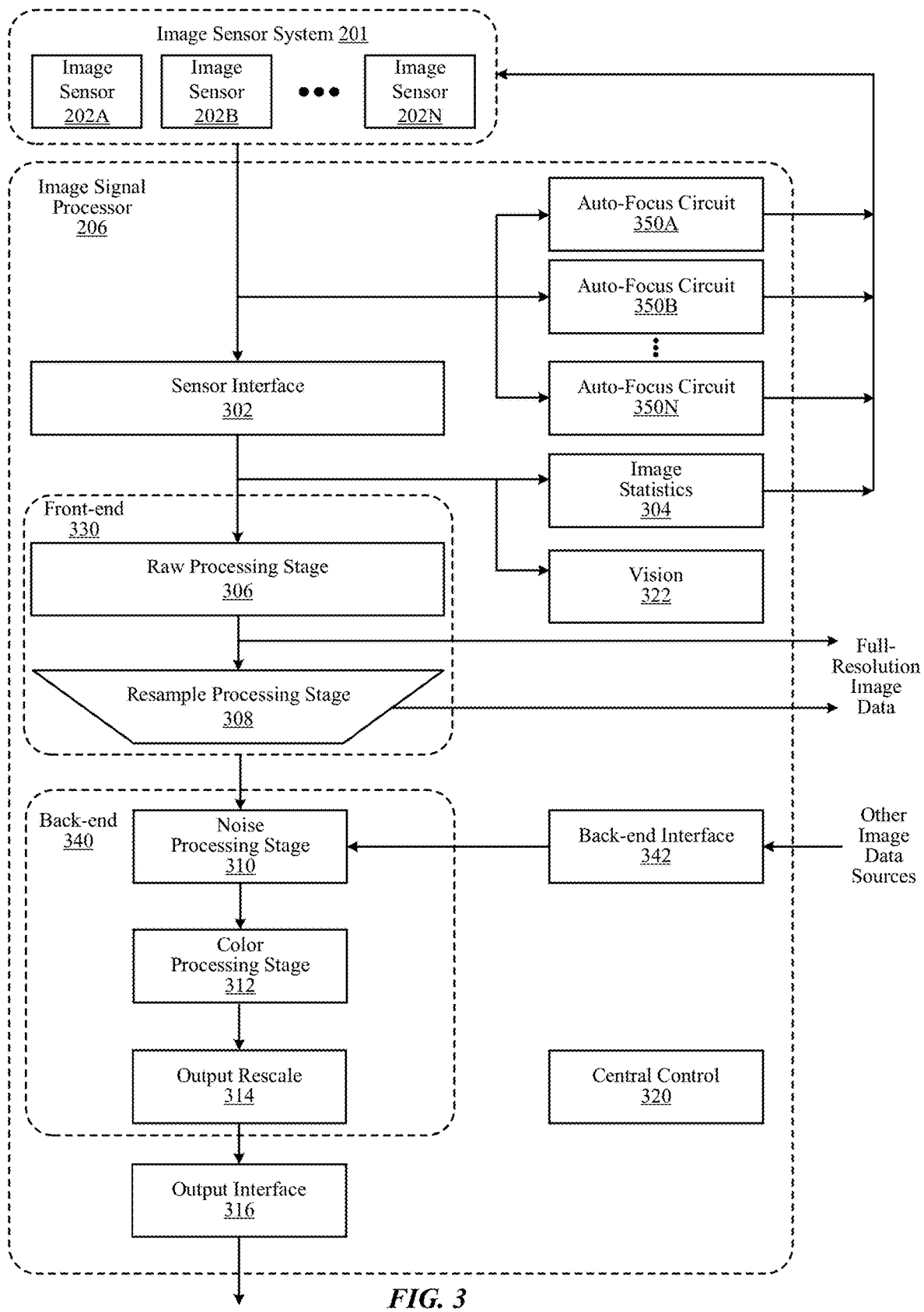
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to an image sensor system 201 that includes one or more image sensors 202A through 202N (hereinafter collectively referred to as "image sensors 202" or also referred individually as "image sensor 202") to receive raw image data. The image sensor system 201 may include one or more sub-systems that control the image sensors 202 individually. In some cases, each image sensor 202 may operate independently while, in other cases, the image sensors 202 may share some components. For example, in one embodiment, two or more image sensors 202 may be share the same circuit board that controls the mechanical components of the image sensors (e.g., actuators that change the focal lengths of each image sensor). The image sensing components of an image sensor 202 may include different types of image sensing components that may provide raw image data in different forms to the ISP 206. For example, in one embodiment, the image sensing components may include a plurality of focus pixels that are used for auto-focusing and a plurality of image pixels that are used for capturing images. In another embodiment, the image sensing pixels may be used for both auto-focusing and image capturing purposes.

ISP 206 implements an image processing pipeline which may include a set of stages that process image information from creation, capture or receipt to output. ISP 206 may include, among other components, sensor interface 302, central control 320, front-end pipeline stages 330, back-end pipeline stages 340, image statistics module 304, vision module 322, back-end interface 342, output interface 316, and auto-focus circuits 350A through 350N (hereinafter collectively referred to as "auto-focus circuits 350" or referred individually as "auto-focus circuits 350"). ISP 206 may include other components not illustrated in FIG. 3 or may omit one or more components illustrated in FIG. 3.

In one or more embodiments, different components of ISP 206 process image data at different rates. In the embodiment of FIG. 3, front-end pipeline stages 330 (e.g., raw processing stage 306 and resample processing stage 308) may process image data at an initial rate. Thus, the various different techniques, adjustments, modifications, or other processing operations performed by these front-end pipeline stages 330 at the initial rate. For example, if the front-end pipeline stages 330 process 2 pixels per clock cycle, then raw processing stage 306 operations (e.g., black level compensation, highlight recovery and defective pixel correction) may process 2 pixels of image data at a time. In contrast, one or more back-end pipeline stages 340 may process image data at a different rate less than the initial data rate. For example, in the embodiment of FIG. 3, back-end pipeline stages 340 (e.g., noise processing stage 310, color processing stage 312, and output rescale 314) may be processed at a reduced rate (e.g., 1 pixel per clock cycle).

Raw image data captured by image sensors 202 may be transmitted to different components of ISP 206 in different manners. In one embodiment, raw image data corresponding to the focus pixels may be sent to the auto-focus circuits 350 while raw image data corresponding to the image pixels may be sent to the sensor interface 302. In another embodiment, raw image data corresponding to both types of pixels may simultaneously be sent to both the auto-focus circuits 350 and the sensor interface 302.

Auto-focus circuits 350 may include hardware circuit that analyzes raw image data to determine an appropriate focal length of each image sensor 202. In one embodiment, the raw image data may include data that is transmitted from image sensing pixels that specializes in image focusing. In another embodiment, raw image data from image capture pixels may also be used for auto-focusing purpose. An auto-focus circuit 350 may perform various image processing operations to generate data that determines the appropriate focal length. The image processing operations may include cropping, binning, image compensation, scaling to generate data that is used for auto-focusing purpose. The auto-focusing data generated by auto-focus circuits 350 may be fed back to the image sensor system 201 to control the focal lengths of the image sensors 202. For example, an image sensor 202 may include a control circuit that analyzes the auto-focusing data to determine a command signal that is sent to an actuator associated with the lens system of the image sensor to change the focal length of the image sensor. The data generated by the auto-focus circuits 350 may also be sent to other components of the ISP 206 for other image processing purposes. For example, some of the data may be sent to image statistics 304 to determine information regarding auto-exposure.

The auto-focus circuits 350 may be individual circuits that are separate from other components such as image statistics 304, sensor interface 302, front-end 330 and back-end 340. This allows the ISP 206 to perform auto-focusing analysis independent of other image processing pipelines. For example, the ISP 206 may analyze raw image data from the image sensor 202A to adjust the focal length of image sensor 202A using the auto-focus circuit 350A while performing downstream image processing of the image data from image sensor 202B simultaneously. In one embodiment, the number of auto-focus circuits 350 may correspond to the number of image sensors 202. In other words, each image sensor 202 may have a corresponding auto-focus circuit that is dedicated to the auto-focusing of the image sensor 202. The device 100 may perform auto focusing for different image sensors 202 even if one or more image sensors 202 are not in active use. This allows a seamless transition between two image sensors 202 when the device 100 switches from one image sensor 202 to another. For example, in one embodiment, a device 100 may include a wide-angle camera and a telephoto camera as a dual back camera system for photo and image processing. The device 100 may display images captured by one of the dual cameras and may switch between the two cameras from time to time. The displayed images may seamless transition from image data captured by one image sensor 202 to image data captured by another image sensor without waiting for the second image sensor 202 to adjust its focal length because two or more auto-focus circuits 350 may continuously provide auto-focus data to the image sensor system 201.

Raw image data captured by different image sensors 202 may also be transmitted to sensor interface 302. Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (e.g., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G and B color components) may be used. Color space conversion refers to converting color space of an input image data into a different format. In one embodiment, resample processing stage 308 converts RBD format into RGB format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), histograms (e.g., 2D color or component) and any other image data information may be collected or tracked. In some embodiments, certain pixels' values, or areas of pixel values may be excluded from collections of certain statistics data when preceding operations identify clipped pixels. Although only a single statistics module 304 is illustrated in FIG. 3, multiple image statistics modules may be included in ISP 206. For example, each image sensor 202 may correspond to an individual image statistics unit 304. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross-correlation between a patch of image and a kernel.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (e.g., no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame and thus the reference frame is not spatially filtered).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, an output rescale module 314 may implement a table of piecewise perspective transforms encoded as digital difference analyzer (DDA) steppers to perform a per-pixel perspective transformation between an input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 350 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Raw Processing Stage

Figure 4:
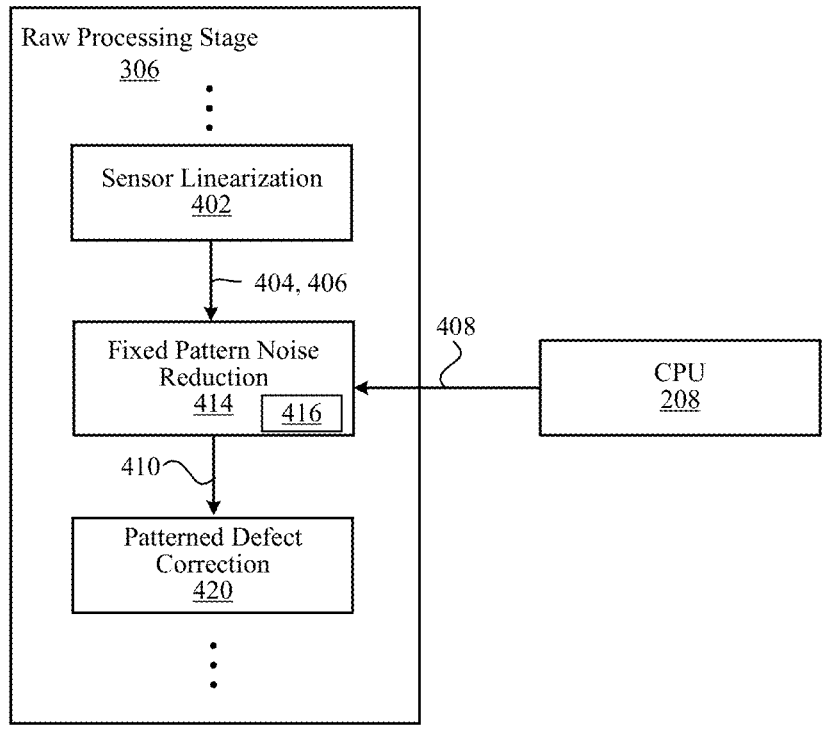
FIG. 4 is a block diagram illustrating components of the raw processing stage of the image signal processor, according to one embodiment.

FIG. 4 is a block diagram illustrating components of the raw processing stage 306 of the image signal processor 206, according to one embodiment. Raw processing stage 306 processes image data in a raw format (e.g., Bayer pattern). The raw processing stage 306 may include, among other components, a sensor linearization circuit 402, a fixed pattern noise reduction circuit 414, and a patterned defect correction circuit 420. The fixed pattern noise reduction circuit 414 includes, among other components, a line banding corrector circuit 416 described below in detail with reference to FIG. 5.

The sensor linearization circuit 402 maps non-linear sensor outputs to linear space for subsequent processing. The sensor linearization circuit 402 provides raw image data to the fixed pattern noise reduction circuit 414. The raw image data includes unmasked pixel data 406 and bias information 404. The bias information is derived from pixel values of one or more masked pixel sensors. The masked pixel sensors are rows or columns of pixel sensors and the sensors may be located at sides of an image sensor 202. Since the masked pixel sensors are covered, the pixel values from the sensors are indicative of noise in the masked pixel sensors (including row banding biases). The unmasked pixel data 406 includes pixel values of unmasked pixel sensors. Thus, the pixel values in the unmasked pixel data 406 may be indicative of received light and noise (including row banding biases).

The fixed pattern noise reduction circuit 414 reduces spatial noise in raw images due to time, temperature, and other external factors. The fixed pattern noise reduction circuit 414 may include, among other components, a frame-based fixed pattern noise correction circuit (to subtract an offset and gain per input pixel based on dark frames captured when the shutter of the camera is closed), a tiled fixed pattern noise correction circuit (to correct spatially periodic black level offset variations), and a line banding corrector circuit 416. The line banding corrector circuit 416 may eliminate or reduce line banding biases in the unmasked pixel data 406 to produce corrected pixel data 410. The line banding corrector circuit 416 is further described with reference to FIG. 5.

The patterned defect correction circuit 420 corrects pixel values of defect pixels that are placed periodically throughout in image data due to certain pixel sensors (e.g., focus pixel sensors).

The sequence and the components in raw processing stage 306 of FIG. 4 is merely illustrative. The components and their arrangement may vary according to specific needs or requirements.

Example Line Banding Correction Circuit

Figure 5:
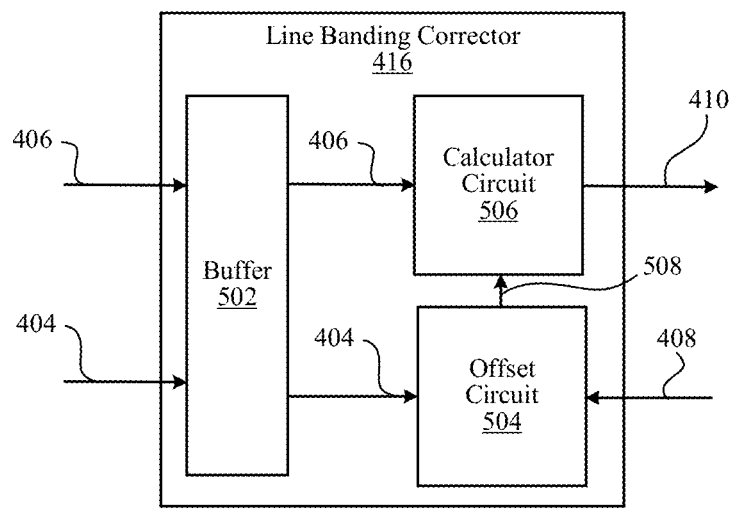
FIG. 5 is a block diagram illustrating components of the line banding corrector circuit, according to one embodiment.

FIG. 5 is a block diagram illustrating components of the line banding corrector circuit 416, according to one embodiment. The line banding corrector circuit 416 reduces or eliminates line banding biases in unmasked pixel data 406. For this purpose, the line banding corrector circuit 416 determines offset values and adds the offset values to pixel values of the unmasked image data 406. The line banding corrector circuit 416 may include, among other components, a buffer 502, an offset circuit 504, and a calculator circuit 506.

The buffer 502 receives and stores the unmasked pixel data 406 and bias information 404 from the sensor linearization circuit 402. The unmasked pixel data 406 and the bias information may be accessed by the offset circuit 504 and the calculator circuit 506 to perform line banding correction.

The offset circuit 504 receives the bias information 404 from the buffer 502 and calculates offset values 508 based on the bias information. The offset circuit 504 determines one or more offset values 508 for a line of pixel values based on bias information associated with the line. Note that a line of pixel values refers to a set of pixel values associated with pixel sensors physically arranged in a line of an image sensor 202 (e.g., a row or column of pixel sensors). Thus, offset value(s) 508 for a line of pixel values are determined based on bias information associated with masked pixels in the same line.

Typically, the offset circuit 504 calculates offset values 508 for all pixel values in the unmasked image data 406. For example, the offset circuit 504 determines offset values 508 for each row of the unmasked image data 406 based on bias information associated with the row. The offset circuit 504 may determine offset values 508 for a subset of the recorded pixel values. For example, if the CPU 208 determines that line banding biases are only present in three rows of pixel values, the offset circuit 504 may only determine offset values 508 for the three rows of pixel values.

The offset circuit 504 can determine offset values 508 differently based on its mode of operation. The mode for determining offset values 508 may be determined by the CPU 208. Specifically, the offset circuit 504 receives a mode command 408 from the CPU 208. The mode command indicates which mode the offset circuit 504 should be placed in to calculate the offset values 508 for the raw image data. The mode command 408 may also indicate the mode for calculating the offset values 508 for specific lines or pixels. The CPU 208 may make these determinations by analyzing the raw image data. For example, the CPU 208 may determine whether line banding artifacts are present in the image data.

In a first mode of the offset circuit, an offset value 508 is calculated for each line of pixels using bias information derived from pixel values of masked pixel sensors at a single side of the image sensor 202 (e.g., a top, bottom, left, or right side of the image sensor 202) in the same line as the pixels to be corrected. For example, bias information from covered pixel sensors on the left side of the image sensor 202 is used to determine offset values 508 for pixel values for a line.

In a second mode, offset values 508 are determined individually for each pixel to be corrected by interpolating bias information from covered pixel sensors on opposite sides of the image sensor 202 and in the same line as the pixel sensor for each pixel. In this mode, each pixel value in a line may be assigned a different offset value by interpolating first bias information derived from pixel values of masked pixel sensors at one side of the image sensor 202, and second bias information derived from pixel values of masked pixel sensors at the opposite side of the image sensor 202.

In a third mode, offset values 508 are determined by averaging bias information derived from masked pixel sensors at opposite sides of the image sensor 202.

After the bias information is determined, the offset circuit 504 determines the offset value. In some embodiments, the offset value is the same as the bias information. In other embodiments, the offset value is an adjusted version of the bias information.

The calculator circuit 506 receives the unmasked pixel data 406 from the buffer 502 and the offset values 508 from the offset circuit 504. Then, the circulator circuit 506 adds the offset values 508 to the unmasked pixel data 406 to generate modified pixel values 410. Specifically, the calculator circuit 506 adds the offset values 508 of each pixel (or line of pixels) to the corresponding pixel value (or line of pixel values) in the unmasked pixel data 406.

Figure 6:
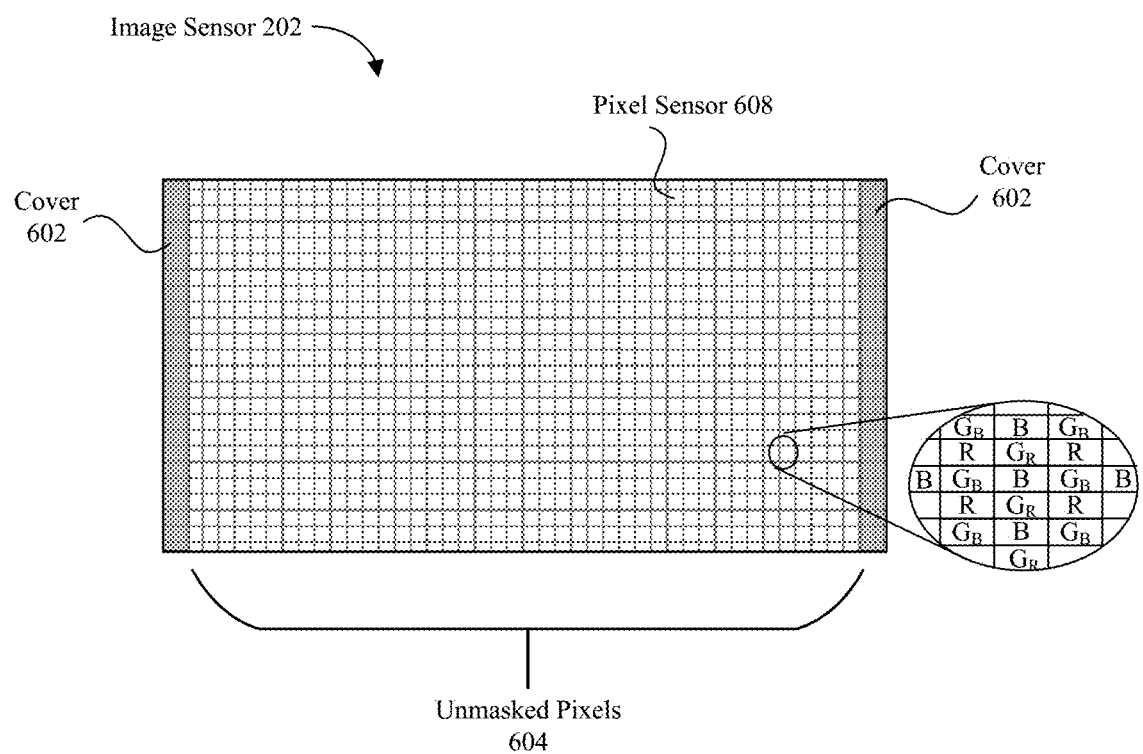
FIG. 6 is a high-level diagram of an image sensor with covers, according to one embodiment.

FIG. 6 is a high-level diagram of an image sensor 202 with covers 602, according to one embodiment. The components in the figure are merely illustrative and the figure may include additional or different components. The image sensor 202 includes an array of pixel sensors 608. While most of the pixel sensors 608 are unmasked pixels 604 that detect light incident on the pixels 604, several columns of pixel sensors 608 are masked by non-transparent covers 602 on left and right sides of the image sensor 202. In the example of FIG. 6, there are masked pixels in every row of the image sensor 202. The covers 602 may be metal plates and the covers 602 may cover one or more columns of pixel sensors 608. The covers 602 prevent the masked pixel sensors (also referred to as covered pixel sensors) from receiving light. Thus, the masked pixel sensors receive no light.

Biased information is obtained from pixel values of the masked pixel sensors. Since the masked pixel sensors do not receive light, the pixel values of the masked pixel sensors may only include undesired pixel sensor noise (and possibly line banding biases). Among other advantages, if a line of pixel sensors 608 is subject to line banding, the output values of the masked pixel sensors of the line will be indicative of biases that results in line banding artifacts in raw image data.

As illustrated in the zoomed portion of FIG. 6, the image sensor 202 includes pixel sensors 608 for capturing different colors of light. The pixel sensors are, for example, arranged according to a Bayer pattern. In these embodiments, biased information is obtained per color channel (e.g., R, Gb, Gr, B).

In the example of FIG. 6, the covers 602 are on the left and right sides. As a result, bias information is derived from the covered pixel sensors 608 on the left and/or right sides. Additionally or alternatively, if the covers are on the top and bottom sides of the image sensor 202, bias information may be derived from masked pixel sensors on the top and/or bottom sides.

Figure 7B:
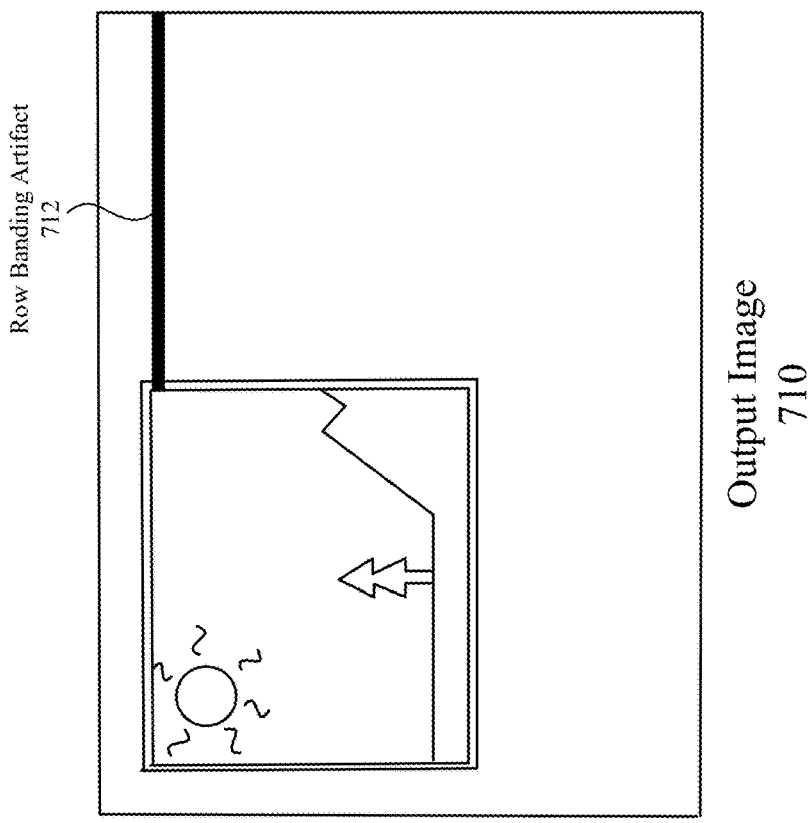
FIG. 7B is an illustration of raw image data of the scene of FIG. 7A with a row banding artifact, according to an embodiment.
Figure 7A:
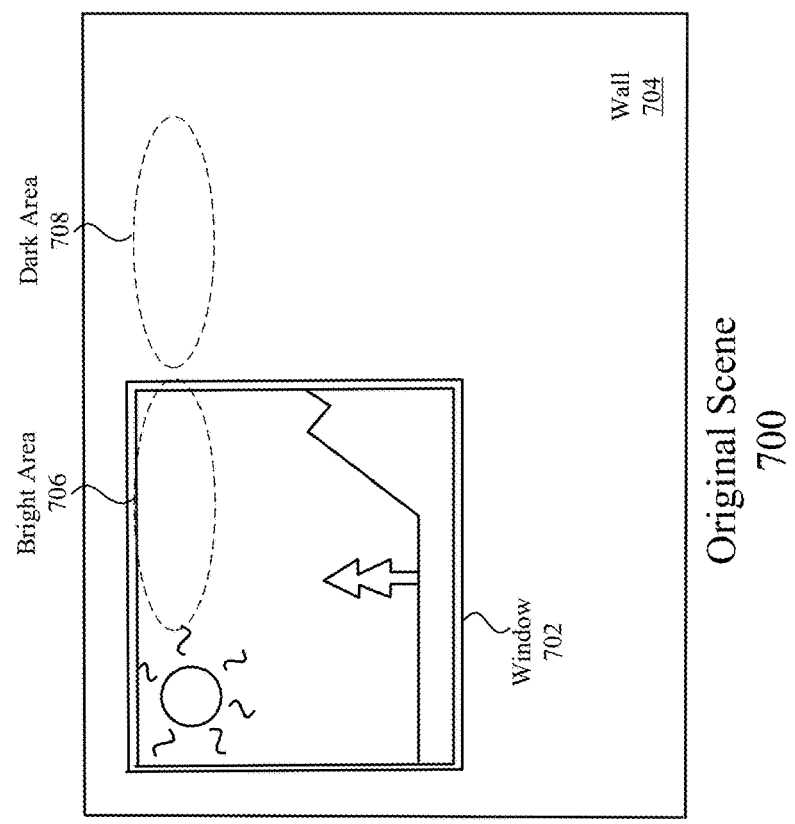
FIG. 7A is an illustration of a scene captured by the image sensor a, according to an embodiment.

FIG. 7A is an illustration of an original scene 700 captured by an image sensor 202, according to an embodiment. FIG. 7B is an illustration of raw image data of the scene of FIG. 7A with a row banding artifact 712, according to an embodiment. The original scene 700 includes a wall 704 with a window 702 in it. Through the window 702 and outside environment is visible. Although not visible in the figure, the outside environment through the window 702 is brighter than the wall 704. Thus, the original scene 700 includes a bright area 706 (at the window) horizontally adjacent to a dark area 708 (at the wall).

The output image 710 is an image that may be produced by an image signal processor without a line banding corrector circuit 416. Since the bright area 706 is horizontally adjacent to the dark area 708, a number of pixel sensors 608 in a row receive light from the bright area 706. Furthermore, a number of pixel sensors 608 in the same row receive light from the dark area 708. This causes a raw image generated by the image sensor 202 to include a row banding artifact 712, particularly in dark regions of the image (e.g., corresponding to the dark area 708), which may become more noticeable if processing operations are performed to increase the brightness of pixels in the dark area 708. The row banding artifact 712 may be isolated to a single row or it may be present in multiple (e.g., all) rows of the output image 710.

Figure 8:
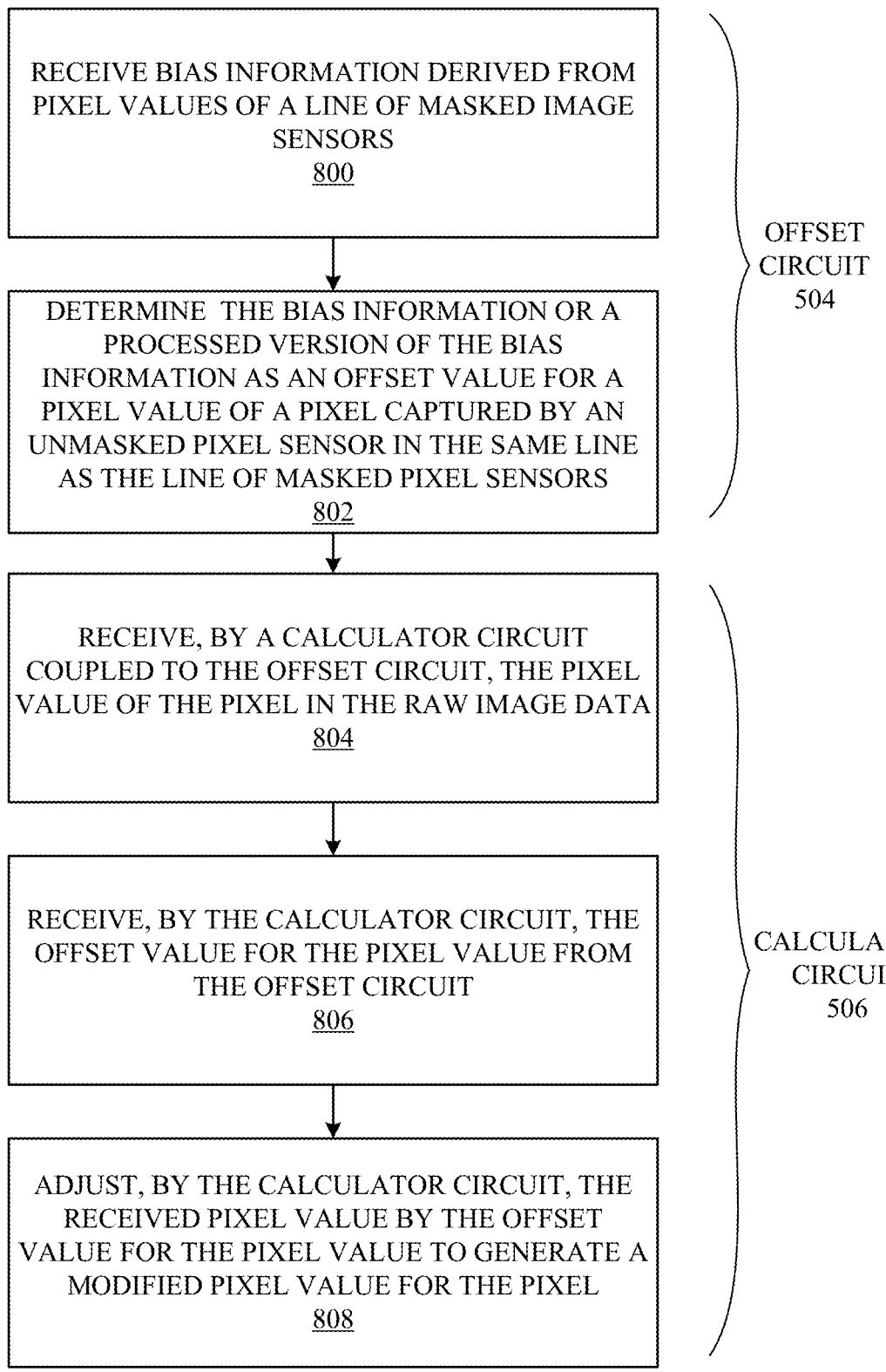
FIG. 8 is a flowchart illustrating a method of removing line banding artifacts, according to one embodiment.

FIG. 8 is a flowchart illustrating a method of removing line banding artifacts, according to one embodiment. The steps of the method may be performed in different orders, and the method may include different, additional, or fewer steps.

An offset circuit receives 800 bias information generated by an image sensor. The image sensor includes a set of pixel sensors. The bias information is derived from pixel values of a line of masked pixel sensors of a same color in the image sensor.

The offset circuit determines 802 the bias information or a processed version of the bias information as an offset value for a pixel value of a pixel in raw image data. The pixel value is captured by an unmasked pixel sensor in the same line as the line of masked pixel sensors. In some embodiments, the line is a row and the offset value is determined from the pixel values corresponding to pixels in each row of the pixel array. The offset circuit may generate distinct sets of offset values for four different color pixels from the masked pixel sensors of four different colors. The offset circuit may operation in different modes to determine the offset value.

A calculator circuit receives 804 the pixel value of the pixel in the raw image data. The calculator circuit receives 806 the offset value for the pixel value from the offset circuit. Then, the calculator circuit adjusts 808 the received pixel value by the offset value for the pixel value to generate a modified pixel value for the pixel.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An image processor comprising:
an offset circuit configured to:
receive bias information generated by an image sensor comprising a plurality of pixel sensors, the bias information derived from pixel values of a line of masked pixel sensors of a same color in the image sensor, the bias information indicative of noise in the line of masked pixel sensors, wherein the bias information comprises first bias information representing processed versions of pixel values of first masked pixel sensors of the same color at one side of the image sensor and the bias information further comprises second bias information representing processed versions of pixel values of second masked pixel sensors of the same color at an opposite side of the image sensor, and
determine an offset value for a pixel value of a pixel in raw image data associated with the bias information, the offset value determined based on the bias information, the pixel value captured by an unmasked pixel sensor in the same line as the line of masked pixel sensors; and a calculator circuit coupled to the offset circuit and configured to:
  receive the pixel value of the pixel in the raw image data,
  receive the offset value for the pixel value from the offset circuit, and
  adjust the received pixel value by the offset value for the pixel value to generate a modified pixel value for the pixel.

2. The image processor of claim 1, wherein the offset circuit is further configured to generate distinct sets of offset values for four different color pixels from the masked pixel sensors of four different colors.

3. The image process of claim 1, wherein the offset circuit is configured to operate in:
  a first mode where the offset value is set as a first value indicated in the first bias information,
  a second mode where the offset value is set as a second value indicated in the second bias information, or
  a third mode where the offset value is set as an interpolated value derived from the first value and the second value.

4. The image process of claim 3, wherein the interpolated value is determined from a first distance of the pixel from the one side of the raw image data and a second distance of the pixel from the opposite side of the raw image data.

5. The image processor of claim 3, wherein the offset circuit is configured to receive a mode command responsive to a central processing unit performing an analysis of the raw image data.

6. The image processor of claim 1, wherein the line is a row and the offset value is determined from pixel values corresponding to pixels in at least one row of the pixel array.

7. A method comprising:
  receiving, by an offset circuit, bias information generated by an image sensor comprising a plurality of pixel sensors, the bias information derived from pixel values of a line of masked pixel sensors of a same color in the image sensor, the bias information indicative of noise in the line of masked pixel sensors, wherein the bias information comprises first bias information representing processed versions of pixel values of first masked pixel sensors of the same color at one side of the image sensor and the bias information further comprises second bias information representing processed versions of pixel values of second masked pixel sensors of the same color at an opposite side of the image sensor;
  determining, by the offset circuit, an offset value for a pixel value of a pixel in raw image data associated with the bias information, the offset value determined based on the bias information, the pixel value captured by an unmasked pixel sensor in the same line as the line of masked pixel sensors;
  receiving, by a calculator circuit coupled to the offset circuit, the pixel value of the pixel in the raw image data;
  receiving, by the calculator circuit, the offset value for the pixel value from the offset circuit; and
  adjusting, by the calculator circuit, the received pixel value by the offset value for the pixel value to generate a modified pixel value for the pixel.

8. The method of claim 7, further comprising:
  generating, by the offset circuit, distinct sets of offset values for four different color pixels from the masked pixel sensors of four different colors.

9. The method of claim 7, wherein the offset circuit operates in:
  a first mode where the offset value is set as a first value indicated in the first bias information,
  a second mode where the offset value is set as a second value indicated in the second bias information, or
  a third mode where the offset value is set as an interpolated value derived from the first value and the second value.

10. The method of claim 9, wherein the interpolated value is determined from a first distance of the pixel from the one side of the raw image data and a second distance of the pixel from the opposite side of the raw image data.

11. The method of claim 9, further comprising:
  receiving, by the offset circuit, a mode command responsive to a central processing unit performing an analysis of the raw image data.

12. The method of claim 7, wherein the line is a row and the offset value is determined from pixel values corresponding to pixels in at least one row of the pixel array.

13. An electronic device comprising:
  an image sensor comprising a plurality of pixel sensors; and
  an image processor comprising:
    an offset circuit configured to:
      receive bias information generated by the image sensor, the bias information derived from pixel values of a line of masked pixel sensors of a same color in the image sensor, the bias information indicative of noise in the line of masked pixel sensors, wherein the bias information comprises first bias information representing processed versions of pixel values of first masked pixel sensors of the same color at one side of the image sensor and the bias information further comprises second bias information representing processed versions of pixel values of second masked pixel sensors of the same color at an opposite side of the image sensor, and
      determine an offset value for a pixel value of a pixel in raw image data associated with the bias information, the offset value determined based on the bias information, the pixel value captured by an unmasked pixel sensor in the same line as the line of masked pixel sensors; and
    a calculator circuit coupled to the offset circuit and configured to:
      receive the pixel value of the pixel in the raw image data,
      receive the offset value for the pixel value from the offset circuit, and
      adjust the received pixel value by the offset value for the pixel value to generate a modified pixel value for the pixel.

14. The electronic device of claim 13, wherein the offset circuit is further configured to generate distinct sets of offset values for four different color pixels from the masked pixel sensors of four different colors.

15. The electronic device of claim 13, wherein the offset circuit is configured to operate in:
  a first mode where the offset value is set as a first value indicated in the first bias information,
  a second mode where the offset value is set as a second value indicated in the second bias information, or
  a third mode where the offset value is set as an interpolated value derived from the first value and the second value.

16. The electronic device of claim 15, wherein the interpolated value is determined from a first distance of the pixel from the one side of the raw image data and a second distance of the pixel from the opposite side of the raw image data.

17. The electronic device of claim 15, wherein the offset circuit is configured to receive a mode command responsive to a central processing unit performing an analysis of the raw image data.

18. The electronic device of claim 15, wherein the line is a row and the offset value is determined from pixel values corresponding to pixels in at least one row of the pixel array.

\* \* \* \* \*